United States Patent
Lin et al.

(10) Patent No.: US 8,082,324 B2
(45) Date of Patent: Dec. 20, 2011

(54) METHOD OF ESTABLISHING A TUNNEL BETWEEN NETWORK TERMINAL DEVICES PASSING THROUGH FIREWALL

(75) Inventors: Yi-Hsiang Lin, Taipei (TW); You-Hsin Yen, Taipei (TW); Chih-Wei Chan, Taipei (TW); Li-Ming Huang, Taipei (TW)

(73) Assignee: D-Link Corporation, Taipei (TW)

( * ) Notice: Subject to any disclaimer, the term of this patent is extended or adjusted under 35 U.S.C. 154(b) by 346 days.

(21) Appl. No.: 11/987,699

(22) Filed: Dec. 4, 2007

(65) Prior Publication Data

US 2009/0106394 A1    Apr. 23, 2009

(30) Foreign Application Priority Data

Oct. 18, 2007    (TW) ................ 96139018 A

(51) Int. Cl.
*G06F 15/16* (2006.01)
(52) U.S. Cl. ...................... 709/218; 709/223
(58) Field of Classification Search .......... 709/223, 709/218; 726/11, 12, 13, 14, 15
See application file for complete search history.

(56) References Cited

U.S. PATENT DOCUMENTS

| | | | |
|---|---|---|---|
| 2006/0215684 A1* | 9/2006 | Capone | 370/437 |
| 2007/0157303 A1* | 7/2007 | Pankratov | 726/11 |
| 2009/0006648 A1* | 1/2009 | Gopalakrishnan et al. | 709/245 |

* cited by examiner

*Primary Examiner* — George Neurauter
*Assistant Examiner* — Suraj Joshi
(74) *Attorney, Agent, or Firm* — Bacon & Thomas, PLLC

(57) ABSTRACT

A method of establishing a tunnel between network terminal devices passing through firewall is applied to a network system which comprises at least two private networks and Internet wherein each of said private networks comprises at least a NAT router and at least a network terminal device (such as a computer, web camera, IP phone, network disk or network printer with network interface etc.), and each of said network terminal devices connects to the Internet through corresponding NAT router respectively. The method enables each of said network terminal devices of said private networks to detect the firewall policy of corresponding NAT router so as to pass through the firewall installed in corresponding NAT router according to its setting and establish a tunnel between said network terminal devices over the Internet for communication and data access by using p2p, a local relay or a remote relay.

2 Claims, 3 Drawing Sheets

METHOD OF ESTABLISHING A TUNNEL BETWEEN NETWORK TERMINAL DEVICES PASSING THROUGH FIREWALL

FIELD OF THE INVENTION

The present invention relates to a network terminal device (such as a computer with network interface, web camera, IP phone, network disk or network printer etc.) and more particularly to a method of enabling network terminal devices of two private networks to establish a tunnel between each other passing through firewall installed in corresponding NAT router.

BACKGROUND OF THE INVENTION

As the computer and communication technologies quickly evolve, all network service providers put their efforts on the fields of carrying messages like voice, data and images etc. through public networks. In the next generation network (NGN for short), network service providers provide various integrated and open network services like voice, data, multimedia and so forth through telecommunication networks. Now the construction of the NGN is still changing, and the major goal is to separate services and transmission technologies so as to make all services available no matter what transmission technologies are adopted. In other words, the NGN is a service-oriented network in which service is separated from invocation and invocation is separated from carrying which makes service to be independent and may be provided with more flexibility and users of the NGN to be able to define their own services regardless of the types of the networks carrying the services or the end devices. In the past, none of the existed data networks including telecommunication, computer and cable networks is capable of being the only platform and used for services with different characteristic. However, as the development of IP technology in recent years, now the telecommunication (wired and wireless), computer and cable networks may be integrated or even combined with the mobile communication network to form a mixed network by using advanced IP technology which enable all IP-based services to be implemented on different networks.

Driven by the network services and integration of networks stated above, the NGN will be implemented by using the distributed network structure that effectively carries voice, video and multimedia data and separates application, control and transmission. During the construction, the existed data network may be smoothly transformed into the NGN with the advantages that the network and end devices may still be working in the NGN and various IP-based protocols may still be adopted as well. And one of the most important issues is how to pass through private network.

The NGN is a kind of network that integrates voice, data, multimedia and mobile communication and may be divided into several network layers below:

(1) access layer: this layer is composed of various gateways, intelligent access end devices and integrated access devices, and connects all kinds of users to networks via various means (like broadband access and mobile access etc.) and transforms data into the format which may be transmitted through networks;

(2) transmission layer: this layer indicates the carrying networks of the NGN that provide public transmission platform for all kinds of services and media streams and mostly adopts packet transmission while so far the main transmission network would be the broadband IP network;

(3) control layer: this layer handles control functions like invocation control protocol selection, mutual connection and execution of business logic, and it also decides services received by users and controls the processing of low layer network unit toward the service flow wherein the main body is composed of soft switch devices; and (4) business layer: this layer handles business logic, provides integrated services facing users, and implements customized services and service-related management like authentication and charging.

The problem for the NGN of passing through private network exists in the access layer of the border of the NGN. The main carrying network of the NGN is constructed on the existed IP network, and to access the network, a user must acquire an IP address which is exhausted due to quick expansion of the Internet. To solve the problem, a large number of intranets and local area networks are equipped with network address translation (NAT for short) devices installed at the border of the networks. The NAT is an Internet standard defined in RFC 1631 and basically is installed in a router at the border between private network and public network for translating IP addresses of packets sent by network terminal devices of a private network thus enabling multiple network terminal devices of the private network to share one IP address. To be more specific, NAT is in charge of translating internal IP addresses of a private network into legal IP addresses of a public network upon receiving IP packets from the private network and translating IP addresses of the public network into IP addresses of the private network through looking up a mapping table maintained in the NAT upon receiving external packets then forward them to the internal destinations. In general, only the translation of IP address and port number is required for an ordinary packet, but this is not the case for applications complying with H.323, session initiation protocol (SIP for short) and media gateway control protocol (MGCP for short) for that the actual media connection information is embedded in the overhead of the packet. Assuming that end device A calls end device B, the calling information of end device A will be transmitted to end device B through soft switch, and after acquiring the IP address of end device A from the overhead embedded in the packet according to H.323 or SIP etc., end device B will try to establish a real-time transport protocol (RTP for short) connection with end device A which will fail due to that the IP address is private and impossible to recognize on public network. Besides, to secure the internal network, most companies will deploy firewalls to control the type and data flow of packets into the internal network, and for IP-based voice, video protocols, IP addresses and port numbers are required to establish a communication tunnel. A dilemma thus arises that each end device of the NGN constantly listens to the external call while passing any uninvited external packet through the port of the firewall by using certain approaches and transferring an external call to an internal end device is prohibited. In the meantime, in voice, video communication, it takes dynamic port allocation to implement transmission and receipt of media stream complying with RTP/RTCP (real-time transport control protocol), thus makes the problem caused by the firewall become an inevitable and major issue during development of the NGN.

Hence, to develop a network system which enables a network terminal device of a private network to connect with a network terminal device of another private network passing through the firewall, thus establishes a free tunnel for communication and data access over the public network has become an important objective to be achieved.

SUMMARY OF THE INVENTION

For the purpose of solving the problems stated above, after hard work of research and experiments for a long time, the inventor has developed a method of establishing a tunnel between network terminal devices passing through firewall of the present invention which enables a network terminal device of a private network to pass through the firewall and establish a free tunnel over the public network for communication and data access with a network terminal device of another private network.

One of the objectives of the present invention is to provide a method of establishing a tunnel between network terminal devices passing through firewall applied to a network system which comprises at least two private networks and the Internet wherein each of said private networks comprises at least a network address translation (NAT for short) router and at least a network terminal device (such as a computer, web camera, IP phone, network disk or network printer with network interface etc.), and each of said network terminal devices connects to the Internet through corresponding NAT router respectively. The method of the present invention enables each of said network terminal devices of said private networks to detect the firewall policy of corresponding NAT router so as to pass through the firewall installed in corresponding NAT router according to its setting and establish a tunnel between said network terminal devices over the Internet for communication and data access by using p2p, a local relay or a remote relay.

Another objective of the present invention is to enable each of said network terminal devices to detect the firewall policy of corresponding NAT router and determine whether the corresponding NAT router allows it to connect to the Internet directly, determine whether the corresponding NAT router allows it to connect to the Internet complying with user datagram protocol (UDP for short) when connecting to the Internet directly is allowed, and determine whether the corresponding NAT router allows it to connect to the Internet complying with universal plug and play (UPnP) Internet gateway device (IGD) or simple traversal of UDP over NAT (STUN) and connect to a network terminal device of a far end private network through the Internet directly by using p2p when connecting to the Internet complying with UDP is allowed.

Another objective of the present invention is to enable each of said network terminal devices to sequentially determine whether corresponding NAT router allows it to connect to the Internet through a remote relay by using a TCP port and a TCP tunnel when connecting to the Internet complying with UDP is prohibited.

Another objective of the present invention is to enable each of said network terminal devices to determine whether the corresponding NAT router allows it to connect to the Internet by using a proxy/socks server, i.e. through a local relay, when connecting to the Internet directly is prohibited.

BRIEF DESCRIPTION OF THE DRAWINGS

The foregoing aspects, as well as many of the attendant advantages and features of the present invention will become more apparent by reference to the following detailed description, when taken in conjunction with the accompanying drawings, wherein.

DETAILED DESCRIPTION OF THE PREFERRED EMBODIMENT

Figure 1:
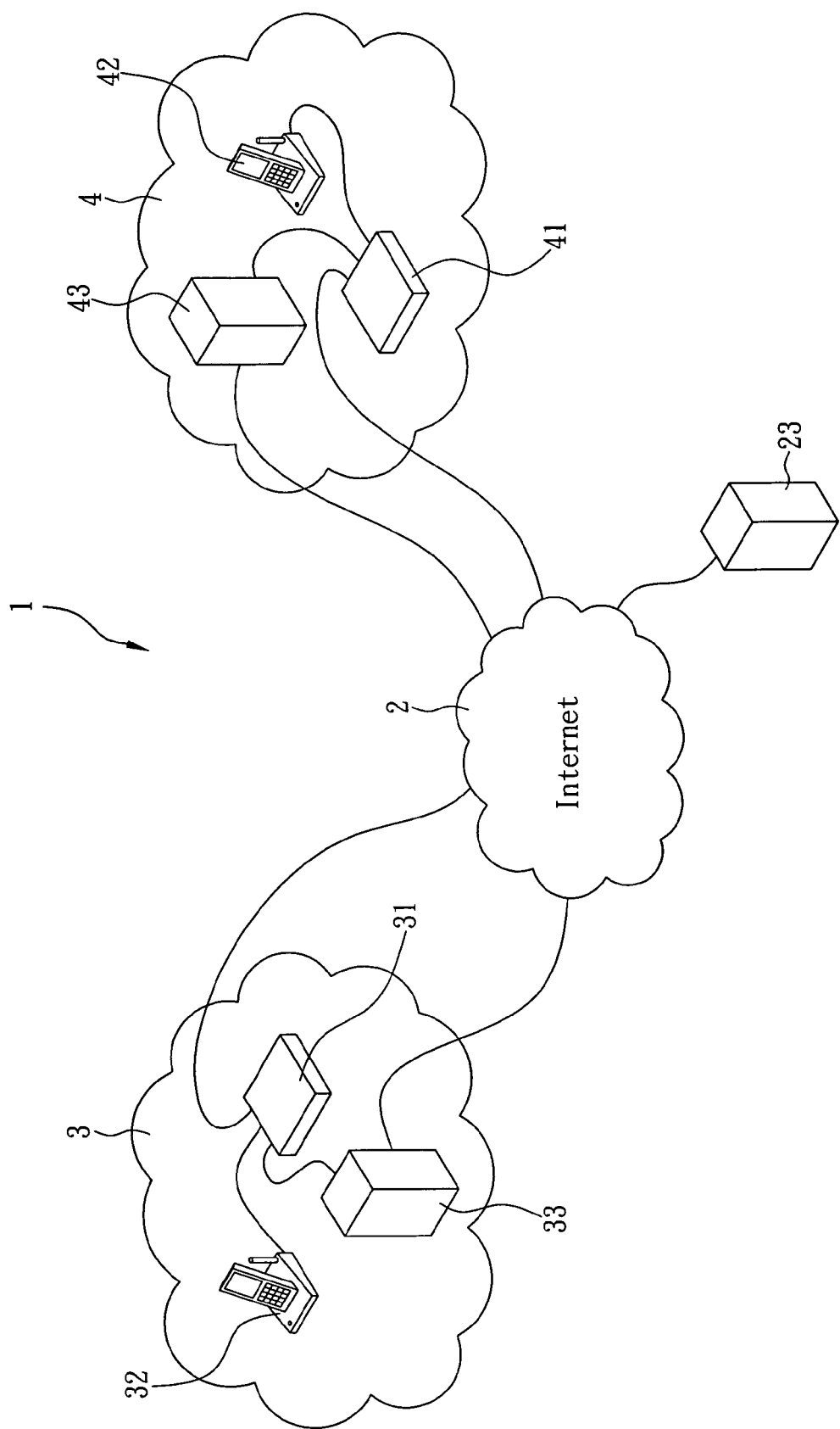
FIG. 1 shows the structure of a network system of a preferred embodiment of the present invention.

The present invention relates to a method of establishing a tunnel between network terminal devices passing through firewall applied to a network system. Please refer to FIG. 1, said method is applied to a network system 1 which comprises the Internet 2 and at least two private networks exemplified with a first private network 3 and a second private network 4 in the following embodiments of the present invention. Each of the private networks 3 and 4 comprises at least a network address translation (NAT for short) router and at least a network terminal device (such as a web camera, IP phone, network disk or network printer etc.) where in the following embodiments of the present invention, the first private network 3 comprises a first NAT router 31 and a first network terminal device 32 while the second private network 4 comprises a second NAT router 41 and a second network terminal device 42. However, in other embodiments of the present invention, each of the private networks 3 and 4 is not limited to the case stated above and may comprise more than one network terminal device. Each of the network terminal devices 32 and 42 connects to the Internet 2 through corresponding NAT router 31 or 41 respectively. Please refer to FIG. 2, said method enables each of the network terminal devices 32 and 42 of the private network 3 or 4 to follow the steps below. And due to that the steps taken by each of the network terminal devices 32 and 42 are the same, only the steps of the first network terminal device 32 of the first private network 3 are explained in detail as an example for convenience. The method comprises the steps of:

(200) sending a plurality of detecting signals to detect the firewall policy of the first NAT router 31;

(201) determining whether the first NAT router 31 allows the first network terminal device 32 to connect to the Internet 2 directly according to the response from the first NAT router 31, proceeding to step (202) when affirmative, otherwise going to step (206);

(202) determining whether the first NAT router 31 does not allow the first network terminal device 32 to connect to the Internet 2 complying with user datagram protocol (UDP for short) according to the response from the first NAT router 31, proceeding to step (203) when affirmative, otherwise going to step (208), wherein in the transportation layer, the TCP/IP may be further divided into transmission control protocol (TCP) and UDP which is a connectionless protocol supporting the most efficient connectionless packet transmission service without guarantee of arrival or order of packets, thus UDP packet is not provided with serial number and the receiver is not going to generate response or check the packets received for duplicate packets or packet loss, and the main reason for certain firewall software not to block UDP packet is to facilitate quick transmission of packets between network terminal devices without assuring their integrity or correctness;

(203) determining whether the first NAT router 31 allows the first network terminal device 32 to connect to the Internet 2 by using a TCP port according to the response from the first NAT router 31, proceeding to step (204) when affirmative, otherwise going to step (212);

(204) determining whether the first NAT router 31 allows the first network terminal device 32 to connect to the Internet 2 by using a TCP tunnel according to the response from the first NAT router 31, proceeding to step (205) when affirmative, otherwise going to step (212);

(205) connecting to the Internet 2 through a remote relay 23, thus the first network terminal device 32 may pass through the firewall installed in the first NAT router 31, connect to the second NAT router 41 of the second private network 4 through the Internet 2 by using the remote relay 32, and send the IP address allocated to the second network terminal device 42 of the second private network 4 through the second NAT router 41, while applying the same procedure, the second network terminal device 42 may send the IP address allocated to the first network terminal device 32, thus enable the network terminal devices 32 and 42 to pass through the firewalls installed in the corresponding NAT router 31 and 41 and establish a free tunnel between them for communication and data access;

(206) determining whether the first NAT router 31 allows the first network terminal device 32 to connect to the Internet 2 by using a proxy/socks server according to the response from the first NAT router 31, proceeding to step (207) when affirmative, otherwise going to step (212);

(207) connecting to the Internet 2 through a first local relay 33, thus the first network terminal device 32 may pass through the firewall installed in the first NAT router 31, and connect to the second NAT router 41 of the second private network 4 through the Internet 2 by using the local relay 33, while applying the same procedure, the second network terminal device 42 may pass through the firewall installed in the second NAT router 41 and establish a free tunnel with the first network terminal device 32 for communication and data access through a second local relay 43;

(208) determining whether the first NAT router 31 allows the first network terminal device 32 to connect to the Internet 2 by using UPnP IGD according to the response from the first NAT router 31, proceeding to step (209) when affirmative, otherwise going to step (212). The UPnP is a common network structure for connecting a computer and its peripheral devices based on Internet standards and technologies and enables different devices to connect to each other and work together automatically, thus accomplish data communication between devices under the management of the network control device. However, the existence of NAT device will "crumble" the UPnP network connection technology frequently used in many families and small enterprises. Generally speaking, an address of public network is necessary to a procedure related to network connection, and each transmission dialogue must use a unique port number that the procedure will be terminated in the case that a private address is used over the Internet (i.e. the public network) or a port number is used by more than two procedures at the same time. This is not a problem to big organizations for they are equipped with professional IT personnel while small organizations and ordinary users on the contrary. To solve the problem stated above, UPnP NAT traversal technology is developed to provide an ideal solution for small organizations and ordinary users wherein the UPnP NAT traversal solution is made by the UPnP IGD Working Committee for IGD and comprises:

(1) manual setup: it requires users to alter certain setting of the IGD with browser or command line interface which seems to be easy to a little part of the users familiar with network technology but difficult to most of them that they even have no idea about the interference to the Internet service caused by NAT traversal. For example, a user may try a multi-player game or other services but find out that the connection fails for certain reasons and be forced to solve the problem or call for technical support which lead to unsatisfactory experience and even unwillingness to new service or technology.

(2) automatic setup: to prevent the problem of manual setup, many IGD manufacturers have developed software supporting application layer and integrated it into IGD wherein said software for application layer is specially-designed that enables a procedure to carry out NAT traversal automatically through editing and testing specific codes. When the software related to said procedure is changed, the application layer codes will need to be updated and tested. In the case that only certain related procedures need to be considered, the above one-on-one-based solution for NAT traversal is feasible for manufacturers, but this is not the case when it comes to hundreds or thousands of procedures that not only the cost is high but information related to said procedures is required. A better solution is to add software or hardware capable of recognizing UPnP to devices manufactured and enables other devices and software to communicate with NAT devices using same technology which currently only UPnP may accomplish.

(209) mapping the TCP port and proceeding to step (210);

(210) determining whether the first NAT router 31 allows the first network terminal device 32 to connect to the Internet 2 complying with STUN according to the response from the first NAT router 31, proceeding to step (211) when affirmative, otherwise going to step (203). The STUN is a protocol for finding out currently what kind of NAT environment a network terminal device (such as an IP phone) is in and enabling VoIP packets complying with SIP to pass through the NAT router, thus an IP phone supporting STUN is capable of automatically changing the corresponding IP address and port number between legal IP address and virtual IP address in SIP/SDP messages which enables SIP and RTP packets to pass through the NAT router without altering the setting of the NAT router. Moreover, STUN server allows all network terminal devices in the private network connected with the NAT router (such as computers behind the firewall) to carry out network communication with VoIP service provider outside the private network. Through a STUN server, a network terminal device may find out information like its public network address, what kind of NAT device it is behind and the information of an Internet UDP port of NAT bound by a local port which may be used to establish UDP communication between two network terminal devices behind the NAT router. Protocols belonged to the category of SIP use UDP packets to transmit voice and video data over the Internet, but due to that usually the end devices in communication are behind the NAT device, the conventional approach is incapable of establishing a connection between them while STUN is workable on the contrary.

(211) connecting to the Internet 2 directly by using p2p, thus the first network terminal device 32 may pass through the firewall installed in the first NAT router 31 and connect to the second NAT router 41 of the second private network 4 through the Internet 2 by using p2p, while applying the same procedure, the second network terminal device 42 may pass through the firewall installed in the second NAT router 41 and establish a free tunnel with the first network terminal device 32 for communication and data access;

(212) displaying a connection failure message on a screen of the first network terminal device 32 to indicate that the first network terminal device 32 is unable to pass through the firewall installed in the first NAT router 31 and terminating the procedure.

Figure 2:
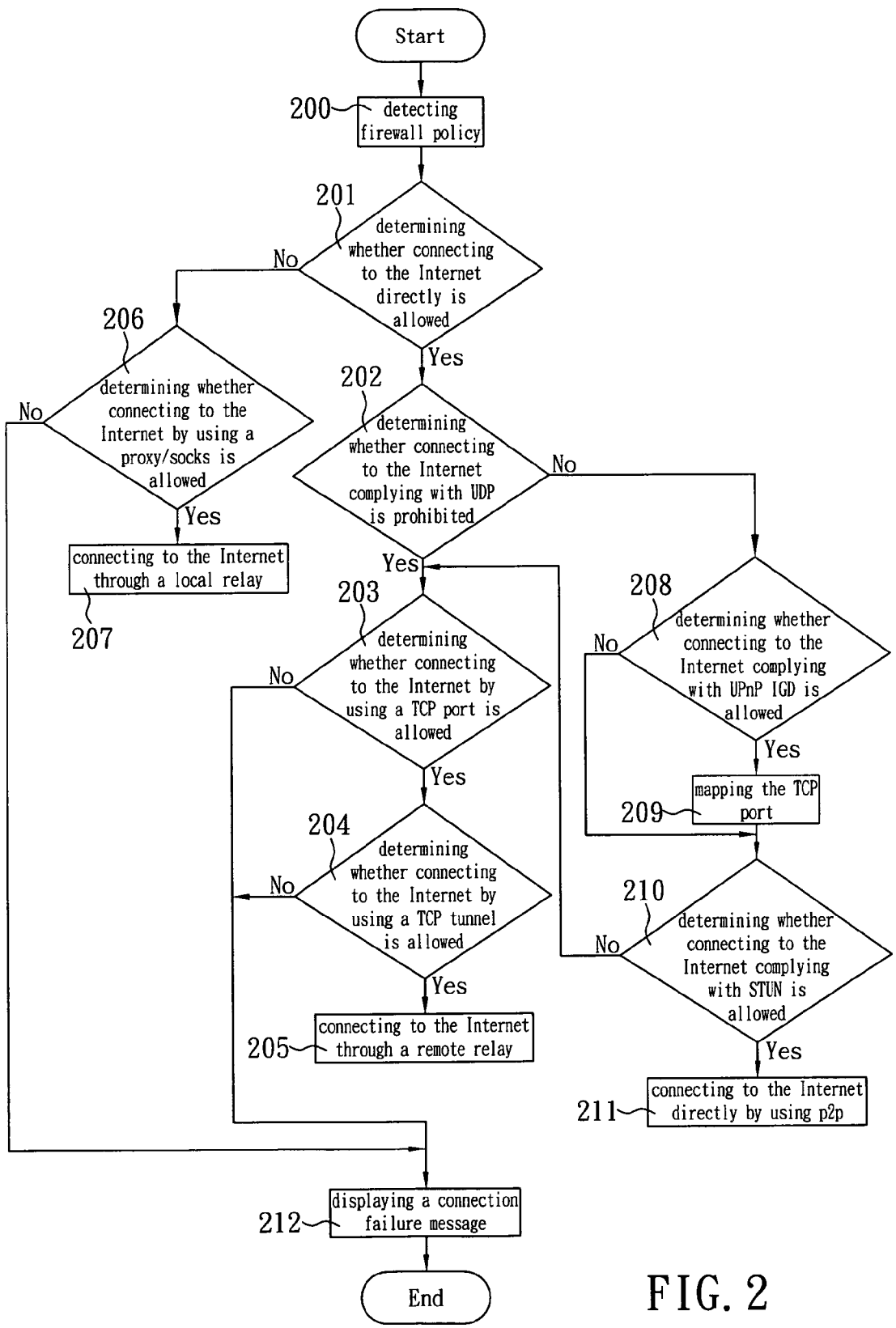
FIG. 2 is a flow chart of a preferred embodiment of the present invention.
Figure 3:
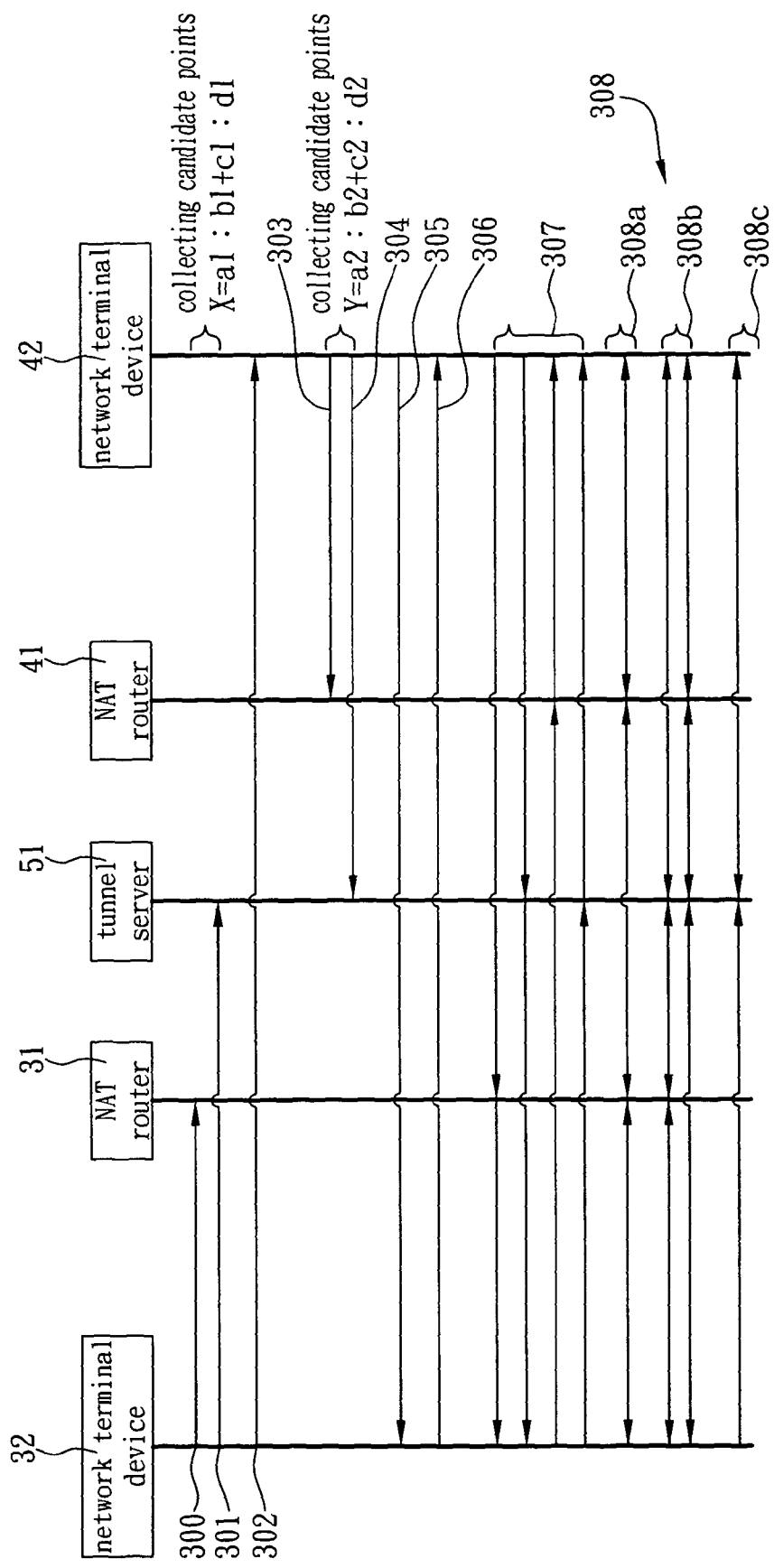
FIG. 3 is a sequence diagram of a preferred embodiment of the present invention showing a first and a second network terminal devices establishing a tunnel for communication and data exchange according to the procedure shown in FIG. 2.

Still refer to FIG. 1, in one embodiment of the present invention, the first and second network terminal devices 32 and 42 are IP phones and connect to a tunnel server 51 (as shown in FIG. 3) having the remote relay 23 on the Internet 2 through the first and second NAT routers 31 and 41 respectively. FIG. 3 is a sequence diagram showing that the first and second network terminal devices 32 and 42 establish a tunnel and exchange data according to the steps stated above. The sequence is as below:

(300) when the first network terminal device 32 sends UPnP packets to the first NAT router 31 for UPnP registration and is allocated an IP address a1 and a connection point of port address b1 from the first NAT router 31, it represents that the second network terminal device 42 connecting to the first network terminal device 32 through the connection point is allowed under the firewall policy of the first NAT router 31;

(301) the first network terminal device 32 establishes a TCP tunnel with the tunnel server 51 passing through the first NAT router 31, sends UDP packets to the tunnel server 51 through the TCP tunnel for registration, and is allocated an IP address c1 and a relay point of port address d1 from the tunnel server 51;

(302) the first network terminal device 32 sends packets to the second network terminal device 42 complying with SIP for invitation, and embeds said connection point (a1, b1) and relay point (c1, d1) in session description protocol (SDP) packets as two new candidate points for connection X, thus together with three original candidate points for connection provided in the interactive connectivity establishment (ICE for short) within SDP packets, the second network terminal device 42 will receive five candidate points for connection from the first network terminal device 32;

(303) the second network terminal device 42 sends UPnP packets to the second NAT router 41 for UPnP registration and is allocated an IP address a2 and a connection point of port address b2 from the second NAT router 41 which represents that the first network terminal device 32 connecting to the second network terminal device 42 through the connection point is allowed under the firewall policy of the second NAT router 41;

(304) the second network terminal device 42 establishes a TCP tunnel with the tunnel server 51 passing through the second NAT router 41, sends UDP packets to the tunnel server 51 through the TCP tunnel for registration, and is allocated an IP address c2 and a relay point of port address d2;

(305) the second network terminal device 42 sends packets to the first network terminal device 32 complying with SIP for approval to the invitation, and embeds said connection point (a2, b2) and relay point (c2, d2) in SDP packets as two new candidate points for connection Y, thus together with three original candidate points for connection provided in the ICE within SDP packets, the first network terminal device 32 will receive five candidate points for connection from the second network terminal device 42;

(306) the first network terminal device 32 sends a packet for acknowledgement after approval packets are received, then the first and second network terminal devices 32 and 42 may choose one from twenty five candidate routes based on five candidate points for connection received by each of them;

(307) each of the first and second network terminal devices 32 and 42 carries out connection check toward said five candidate points for connection received by each of them respectively, wherein in the sequence diagram shown in FIG. 3, the second network terminal device 42 proceeds connection check toward the first NAT router 31 or the tunnel server 51 by using two candidate points for connection (a1, b1) and (c1, d1) while the first network terminal device 32 proceeds connection check toward the second NAT router 41 or the tunnel server 51 by using two candidate points for connection (a2, b2) and (c2, d2);

(308) after the first and second network terminal devices 32 and 42 have checked the status of said candidate points for connection and found them in normal operation, the first and second network terminal devices 32 and 42 may choose one of the tunnels below so as to establish a free tunnel between network terminal devices 32 and 42 for communication and data access passing through the firewalls installed in the first and second NAT routers 31 and 32:

(308a) both network terminal devices use the UPnP ports allocated by corresponding NAT routers to establish a tunnel for RTP streaming transmission;

(308b) one network terminal device uses the UPnP port allocated by its corresponding NAT router while the other network terminal device uses the tunnel port allocated by the tunnel server 51 to establish a tunnel for RTP streaming transmission;

(308c) both network terminal devices use the tunnel ports allocated by the tunnel server 51 to establish a tunnel for RTP streaming transmission.

While the invention herein disclosed has been described by means of specific embodiments, numerous modifications and variations could be made thereto by those skilled in the art without departing from the scope and spirit of the invention set forth in the claims.

What is claimed is:

1. A method of establishing a tunnel between network terminal devices passing through a firewall applied to a network system having at least two private networks and the Internet, wherein each of said private networks comprises at least a Network Address Translation (NAT) router and at least one network terminal device of the network terminal devices, and each said network terminal device connects to the Internet through said NAT router corresponding thereto respectively, at least one network terminal device of a first private network of the at least two private networks performing the steps of:

sending a plurality of detecting signals to said NAT router corresponding thereto and then detecting detect firewall policy of said corresponding NAT router;

determining whether said corresponding NAT router allows said network terminal device to directly connect to the Internet according to a response received from said corresponding NAT router after the firewall policy of said corresponding NAT router is detected;

determining whether said corresponding NAT router allows said network terminal device to connect to the Internet by using a User Datagram Protocol (UDP) according to said response when it is determined that directly connecting to the Internet directly is allowed;

determining whether said corresponding NAT router allows said network terminal device to connect to the Internet by using a Universal Plug and Play Internet Gateway Device (UPnP IGD) according to said response when it is determined that connecting to the Internet by using the UDP is allowed;

mapping a Transmission Control Protocol (TCP) port when it is determined that connecting to the Internet by using the UPnP IGD is allowed;

determining whether said corresponding NAT router allows said network terminal device to connect to the Internet by using a Simple Traversal of UDP over NAT (STUN) according to said response;

connecting to the Internet directly by using a peer-to-peer (p2p) when it is determined that connecting to the Internet by using the STUN is allowed, whereby said network terminal device is able to pass through the firewall installed in said corresponding NAT router and establish a tunnel with a network terminal device of a second private network of the at least two private networks over the Internet for communication and data access by using the p2p;

determining whether said corresponding NAT router allows said network terminal device to connect to the Internet by using a TCP port according to said response when it is determined that connecting to the Internet using the STUN is prohibited;

determining whether said corresponding NAT router allows said network terminal device to connect to the Internet by using a TCP tunnel according to said response when it is determined that connecting to the Internet using the TCP port is allowed; and connecting to the Internet through a remote relay when it is determined that connecting to the Internet by using the TCP tunnel is allowed.

2. A method of establishing a tunnel between network terminal devices passing through a firewall applied to a network system having at least two private networks and the Internet, wherein each of said private networks comprises at least a Network Address Translation (NAT) router and at least one network terminal device of the network terminal devices, and each said network terminal device connects to the Internet through said NAT router corresponding thereto respectively, at least one network terminal device of a first private network of the at least two private networks performing the steps of:

sending a plurality of detecting signals to said NAT router corresponding thereto and then detecting firewall policy of said corresponding NAT router;

determining whether said corresponding NAT router allows said network terminal device to directly connect to the Internet according to a response received from said corresponding NAT router after the firewall policy of said corresponding NAT router is detected;

determining whether said corresponding NAT router allows said network terminal device to connect to the Internet by using a User Datagram Protocol (UDP) according to said response when it is determined that directly connecting to the Internet is allowed;

determining whether said corresponding NAT router allows said network terminal device to connect to the Internet by using a Universal Plug and Play Internet Gateway Device (UPnP IGD) according to said response when it is determined that connecting to the Internet by using the UDP is allowed;

determining whether said corresponding NAT router allows said network terminal device to connect to the Internet by using a Simple Traversal of UDP over NAT (STUN) according to said response when it is determined that connecting to the Internet by using the UPnP IGD is prohibited;

connecting to the Internet directly by using a peer-to-peer (p2p) when it is determined that connecting to the Internet by using the STUN is allowed, whereby said network terminal device is able to pass through the firewall installed in said corresponding NAT router and establish a tunnel with a network terminal device of a second private network of the at least two private networks over the Internet for communication and data access by using the p2p;

determining whether said corresponding NAT router allows said network terminal device to connect to the Internet by using a TCP port according to said response when it is determined that connecting to the Internet using the STUN is prohibited;

determining whether said corresponding NAT router allows said network terminal device to connect to the Internet by using a TCP tunnel according to said response when it is determined that connecting to the Internet using the TCP port is allowed; and connecting to the Internet through a remote relay when it is determined that connecting to the Internet by using the TCP tunnel is allowed.

* * * * *